United States Patent [19]

van Gils et al.

[11] 3,930,095

[45] Dec. 30, 1975

[54] COMPOSITE OF RUBBER BONDED TO GLASS FIBERS

[75] Inventors: Gerard E. van Gils, Tallmadge; Edward F. Kalafus, Akron, both of Ohio

[73] Assignee: The General Tire & Rubber Company, Akron, Ohio

[22] Filed: July 19, 1973

[21] Appl. No.: 380,939

[52] U.S. Cl............ 428/251; 57/140 G; 57/140 C; 57/153; 156/110 A; 156/331; 156/335; 260/29.7 NR; 260/29.7 E; 260/29.7 UA; 260/54; 260/88.1 PA; 260/846; 428/261; 428/268; 428/273; 428/295; 428/378; 428/382; 428/383; 428/392; 428/441; 428/494; 428/495; 428/506; 428/521
[51] Int. Cl.². B29H 9/02; B32B 17/04; B32B 25/02
[58] Field of Search............ 57/140 G, 140 C, 153; 161/143, 144, 175, 198, 203, 241, 242, 243, 248, 401, DIG. 4; 260/4 R, 29.3, 29.6 HN, 29.6 NR, 29.6 ME, 29.7 NR, 29.7 E, 29.7 UA, 47 R, 54, 82.1, 88.1 PA, 846

[56] References Cited
UNITED STATES PATENTS

| | | | |
|---|---|---|---|
| 2,561,215 | 7/1951 | Mighton | 161/203 |
| 2,889,374 | 6/1959 | Meyers | 260/47 R |
| 3,041,301 | 6/1962 | Armour | 260/29.6 ME |
| 3,325,333 | 6/1967 | Kigane et al. | 260/54 |
| 3,367,793 | 2/1968 | Atwell | 161/248 |
| 3,437,122 | 4/1969 | van Gils | 161/248 |
| 3,454,508 | 7/1969 | Herrick et al. | 260/29.3 |
| 3,533,830 | 10/1970 | Marzocchi et al. | 161/198 |
| 3,538,972 | 10/1970 | Yurcick | 161/241 |
| 3,547,729 | 12/1970 | Kibler | 260/29.3 |
| 3,549,481 | 12/1970 | Cesare et al. | 161/241 |
| 3,577,377 | 5/1971 | Tai | 260/29.7 E |
| 3,578,613 | 5/1971 | Tai | 260/846 |
| 3,705,075 | 12/1972 | Marzocchi | 57/164 |
| 3,814,713 | 6/1974 | Honda et al. | 260/54 |
| 3,817,890 | 6/1974 | Rouzier | 260/54 |

FOREIGN PATENTS OR APPLICATIONS 2,115,507   7/1972   France

OTHER PUBLICATIONS

Duval et al., Journal of Applied Polymer Science, 16 (7), 1585–1602 (1972).
C.A. 79 43737u Abstract of Hultzsch et al. German Patent No. 1,770,816.
C.A. 79 19499x Abstract of Article by Tsuge et al.

*Primary Examiner*—J. C. Cannon

[57] ABSTRACT

An aqueous alkaline dispersion of a rubbery vinyl pyridine copolymer, trimethylol phenol, and resorcinol compound, in certain amounts, is useful in forming an adhesive for bonding glass fiber reinforcing elements or cords to rubber compounds or stocks. After dipping the glass fiber cord in the one-step adhesive dip, the coated cord is heated to dry it and heat cure or heat set the adhesive on the cord. Thereafter, the adhesive containing glass fiber cord is combined or laminated (calendered) with a curable rubber compound and the resulting assembly is cured to form a composite in which the glass fiber cord is bonded to the rubber by means of said adhesive.

10 Claims, No Drawings

COMPOSITE OF RUBBER BONDED TO GLASS FIBERS

OBJECTS

An object of the invention is to provide a composite of a glass fiber reinforcing element adhesively bonded to a rubber compound, e.g., glass fiber tire cords adhesively bonded to provide carcass plies and belt plies for making tires. Another object is to provide glass fiber reinforcing elements, e.g., such as those used in the belt and the carcass plies of tires, with a minor amount of an adhesive so that the adhesive containing elements may subsequently be bonded to rubber on curing. A further object is to provide a method for bonding glass fibers, particularly glass fiber textiles, fibers, cords and so forth, to rubber compounds using a single dip. These and other objects and advantages of the present invention will become more apparent to those skilled in the art from the following detailed description and working examples.

SUMMARY OF THE INVENTION

According to the present invention it has been discovered that a composition comprising essentially an aqueous alkaline dispersion generally of 100 parts by weight (dry) of a rubbery vinyl pyridine copolymer, from about 2 to 28 parts by weight of trimethylol phenol, from about 0.0 to 24 parts by weight of a water soluble resorcinol compound selected from the group consisting of resorcinol or a resorcinol-formaldehyde non heat hardenable, water soluble and thermoplastic compound (a fusible novolak or novolak resin), from about 0 to 3 parts by weight of an alkaline material selected from the group consisting of $NH_4OH$ and $NaOH$, and from about 170 to 1100 parts by weight of water, is very useful as a treating, dipping or coating material for use in bonding glass fiber reinforcing elements to rubber compounds. Sufficient alkaline material such as aqueous $NH_3$ or $NaOH$ is added to the dispersion (or to one or more of the ingredients of the dispersion before mixing them together) to obtain the desired pH, prevent coagulation of the latex and to provide for stabilization. This will vary with the acidity of the resorcinol or novolak and the pH of the latex, all of which may vary from batch to batch. Since the amount of each compound may vary, the amount of alkaline material required can also vary. After drying the adhesive on the glass fiber reinforcing element to remove water and to heat cure or heat set the adhesive on the element, the adhesive containing element can then be combined or calendered with a curable rubber compound and the resulting assembly cured, usually in a mold, to provide a laminate exhibiting good adhesive properties.

The present method involves only one dipping step and the process or method can be varied to provide the desired pick-up or solids on the cord by varying the concentration of the dip or the speed of the cord through the dip to give the amount needed to develop the requisite adhesive bond. Thus, while the cord can be run through successive dips of the same or varying amounts of the above materials to get the desired buildup, this is unnecessary as satisfactory results can be accomplished in one dip. Pre or post dips of other adhesive compositions are unnecessary when using the present aqueous adhesive dip.

Another advantage in employing the glass fiber cord dip of the present invention is that the components of the dip do not need to be pre-reacted. Many of the dips are stable at high solids concentrations for extended periods of time. In many instances equivalent adhesion is observed at lower levels by weight of deposited dip solids. The dried and/or cured adhesive coated cord can exhibit higher tensile strengths, and the dried and/or cured adhesive coated cord can be coated uniformly without blister, in other words, it is smooth.

DISCUSSION OF DETAILS AND PREFERRED EMBODIMENTS

The glass fiber reinforcing element or cord comprises a plurality of substantially continuous and parallel glass fibers or monofilaments. The reinforcing element or fiber contain little or no twist. In other words, twist is not intentionally applied to the element or fibers; the only twist, if any, in the element or fibers is that occasioned on passing through the glass fiber processing apparatus and on packaging or winding up the cord to form a bobbin or spool. However, in a continuous process, the elements can proceed directly from the glass processing apparatus, can be dipped in the aqueous adhesive cord dip, dried, and given a twist of about 1.5 turns per inch thereafter. The elements then are woven into tire fabric having about one quite small pick thread or element, nylon or polyester, which may be a monofilament, per inch and calendered with a rubber ply or skin stock. The glass fiber reinforced ply stock is then ready to be used in the manufacture of a tire or for other purposes.

Glass compositions useful in making the fibers for the reinforcing element or glass tire cord are well known to the art. A preferred glass to use is a glass known as E glass and described in "Mechanics of Pneumatic Tires," Clark, National Bureau of Standards Monograph 122, U.S. Dept. of Commerce, issued November, 1971, pages 241–243, 290, and 291. The number of glass filaments or fibers employed in the glass fiber reinforcing element or cord can vary considerably depending on the ultimate use or service requirements. Likewise, the number of strands of glass fibers used to make a glass fiber reinforcing element or cord can vary widely. In general, the number of filaments in the glass fiber reinforcing element or cord for a passenger car tire can vary from about 500 to 3,000 and the number of strands in the reinforcing element can vary from 1 to 10, preferably the number of strands is from 1 to 7 and the total number of filaments about 2000. A representative industry tire cord known as G-75 has 5 strands each with 408 glass filaments. Another representative cord known as G-15 has a single strand containing 2040 glass filaments. In this connection reference is made to Wolf, "Rubber Journal," February, 1971, pages 26 and 27 and U.S. Pat. No. 3,433,689.

Shortly after the glass fibers are formed they are usually sized (by spraying or dipping and so forth and air drying) with a very small amount or fractional amount by weight of a material which acts as a protective coating during processing and handling of the glass fibers in forming the strands or reinforcing elements and during packaging. During the subsequent dipping in the aqueous adhesive tire cord dip, it is believed that the size is not removed. Materials for use as sizes for glass fibers are well known in the art. It is preferred to use a silane as a size, especially a silane which has groups which can bond or coordinate chemically or physically with at least parts of the surface of the glass of the glass fiber and with at least one or more of the components of the glass fiber aqueous adhesive cord dip. A very useful size to employ on the glass fibers is gamma-aminopropyl triethoxysilane, or similar aminoalkyl alkoxy silanes, which, when applied to the glass fibers, hydrolyzes and polymerizes to form a poly(aminosiloxane) in which a portion of the polymer is attached to the glass and another portion contains amine groups (having active hydrogen atoms) for reaction with components of the cord dip such as the RF resin or the trimethylol phenol. Various glass fiber sizing compounds and compositions are shown in U.S. Pat. Nos. 3,252,278; 3,287,204; and 3,538,974.

The type of rubber latex used in the tire cord dip bath of this invention is a latex of a copolymer of a vinyl pyridine and a conjugated diolefin having 4 to 6 carbon atoms. The rubber latex is of the type described in U.S. Pat. No. 2,561,215 and comprises an aqueous dispersion of a copolymer of 50 to 95 percent by weight of a conjugated diolefin having 4 to 6 carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl-2-vinyl pyridine.

In practicing this invention, it is usually preferred to use a latex of a copolymer of from about 60 to 80% by weight butadiene-1,3, about 7 to 32% styrene and about 5 to 22% of 2-vinyl pyridine. Excellent results are obtained using a latex of a terpolymer of about 70% by weight of butadiene-1,3, 15% styrene and 15% 2-vinyl pyridine having a total solids contents of around 30 to 50% by weight. Also, blends of latices may be used such as a blend of butadiene-1,3/2-vinyl pyridine rubbery copolymer latex and a butadiene-1,3/styrene rubbery copolymer latex or a blend of a butadiene-1,3/styrene/2-vinyl pyridine rubbery copolymer latex and a butadiene-1,3/styrene rubbery copolymer latex so long as the percent by weight ratio of total monomers in the copolymers is within the ranges as specified above. The pH of the latices should be similar and the surfactants and stabilizers including freeze stabilizers should be compatible to avoid coagulation on blending or mixing of the latices. The polymers from these latices have Mooney viscosities ML-4 min. at 212°F. of from about 40 to 120. Further disclosures of rubbery vinyl pyridine copolymer latices may be found in U.S. Pat. Nos. 2,615,826 and 3,437,122.

The trimethylol phenol is prepared by the reaction of an excess of formaldehyde with phenol using a catalytic amount of base (NaOH) under nitrogen. The excess of $H_2CO$ drives the reaction to a high content of trimethylol phenol (2,4,6-trimethylol phenol) which is water soluble. The unreacted aldehyde can be removed by venting with reduced pressure. The base can be neutralized with acid to a pH of about 7. In preparing trimethylol phenol, after the first mol of formaldehyde has added to the phenol, the second and third additions are easier.

The resorcinol compound is resorcinol or a water soluble, thermoplastic and non-heat hardenable (without a curing agent or crosslinker) resorcinol-formaldehyde novalak or novalak resin or mixture thereof. The novolaks are prepared under acid conditions by the reaction of resorcinol and formaldehyde (or a formaldehyde donor like paraformaldehyde) to provide compounds having reactive phenolic hydroxy groups rather than methylol groups. The mol ratio of resorcinol to formaldehyde can vary over a considerable range to provide novolaks useful in the practice of the present invention although a preferred mol ratio of resorcinol to formaldehyde is about 1:0.5 to 2.0. These compounds and methods for making them are well known in the art.

Examples of commercially available resorcinol compounds are the water soluble novolak resins known as Arofene 779 (Ashland Chemical Co.) having a mol ratio of resorcinol to formaldehyde of about 1/0.62 and a commercially available novolak resin which comprises a mixture of about 15 parts by weight of resorcinol, 42.5 parts of diresorcinol methane (R/F/R) and 42.5 parts of a low molecular weight R/F novolak resin of a R/F mol ratio of about 3/2.

Since the resorcinol compound is acidic or prepared under acidic conditions, it should be neutralized or sufficient base such as $NH_4OH$ or NaOH added to it to prevent coagulation of the latex when the resorcinol compound is mixed with the latex. NaOH is preferred for dip viscosity stability. Even though the latex is alkaline, sufficient additional base may still be necessary to prevent such coagulation or premature coagulation and the consequent inability to use the dip properly.

Information on the preparation of the novolaks will be found in "Encyclopedia of Chemical Technology," Kirk-Othmer, Volume 15, Second Edition, 1968, Interscience Publishers Division of John Wiley & Sons, Inc., New York, pages 176 to 208; "Technology of Adhesives," Delmonte, Reinhold Publishing Corp., New York, N.Y., 1947, pages 30 to 31; and "Formaldehyde," Walker, A.C.S. Monograph Series, Reinhold Publishing Corp., New York, N.Y., Third Edition, 1964, pages 336 to 339.

Water is used in an amount sufficient to provide for the desired dispersion of the rubber or latex particles, for the solution of the trimethylol phenol and resorcinol compound, to obtain the desired viscosities, and for the proper solids content to get the necessary pick-up of solids on and penetration between the fibers of the cord.

Based on 100 parts by weight (dry weight) of the vinyl pyridine rubber copolymer, or blend of the same, the dip generally comprises the rubber, from about 2 to 28 parts by weight of the trimethylol phenol, from about 0.0 to 24 parts by weight of the resorcinol compound, from about 0 to 3.0 parts by weight of water soluble base such as $NH_4OH$ or NaOH to provide a pH of at least 7.0, and from about 170 to 1100 parts by weight of water.

In order to provide data for the tire cord adhesive of this invention, a standard single-cord H-pull test is employed to determine the static adhesion at room temperature and above of the adhesive-coated glass tire cord to rubber. All the data submitted herein including the working examples which follow are based upon identical test conditions, and all test specimens are prepared and tested in the same way generally in accordance with ASTM Designation: D 2138-67.

To apply the latex to the glass fiber cords in a reliable manner, the cords are fed through the adhesive dip bath while being maintained under a small predetermined tension and into a drying oven where they are dried under a small predetermined tension (to prevent sagging without any appreciable stretching). As the cords leave the oven they enter a cooling zone where they are air cooled before the tension is released. In each case the adhesive-coated cords leaving the dip are dried in the oven at from about 200° to 500°F. for from about 5–300 seconds, preferably at from about 400° to 450°F. for from about 90 to 30 seconds. The time the cord remains in the one-step adhesive dip is about a few seconds or so or at least for a period of time sufficient to allow wetting of the cord and at least substantial total impregnation of the fibers of the cord. The drying or curing of the adhesive treated glass fiber cord may be accomplished in one or more ovens at different times and temperatures.

The single-cord H-pull test is then employed to determine the static adhesion of the dried adhesive coated glass fiber cords to rubber. In each case the rubber test specimens are made from the same standard type rubber composition using the following recipe:

| Material | Parts by Weight |
|---|---|
| Natural rubber, No. 3 smoked sheet | 50. |
| Rubbery butadiene-1,3/styrene copolymer, cold emulsion copolymerized, SBR-1502, about 23½% by weight bound styrene, Mooney viscosity ML-4 min. at 212°F=46–58 | 50. |
| Activated zinc salt of pentachlorothiophenol, Endor, duPont | 0.5 |
| Carbon black, high abrasion furnace | 35. |
| Zinc oxide | 3. |
| Stearic acid | 1. |
| Alkyl aromatic polyindene resin, reinforcing and processing aid, Picco 100, Pennsylvania Industrial Chemical Corp. | 2. |
| Mixture of mono-, di- and tri-styrenated phenols, AgeRite Spar, R.T. Vanderbilt Co., Inc., antioxidant | 1. |
| Circosol 2XH, naphthenic type oil, Sun Oil Co. | 7. |
| Diphenyl guanidine | 0.5 |
| Nobs No. 1, selected blend of 90% Nobs Special (N-oxydiethylene benzothiazole-2-sulfenamide) and 10% MBTS (benzothiazyl disulfide), American Cyanamide Co. | 0.9 |
| Crystex, insoluble sulfur, specially refined elementary sulfur in polymerized form, Stauffer Chemical Co. | 3.25 |

In every case the cords to be tested are placed in parallel positions in a multiple-strand mold of the type described in the single-cord H-pull adhesion test ASTM designated D 2138-67, the mold is filled with unvulcanized rubber of the above composition, the cords being maintained under a tension of 50 grams each, and the rubber is cured 20 minutes at around 305°F. to the elastic state. Each rubber test specimen is ¼ inch thick and has a ⅝ inch cord embedment.

After the rubber has been cured, the hot reticulate cured rubber piece is removed from the mold, cooled and H-test specimens are cut from said piece, each specimen consisting of a single cord encased in rubber and having each end embedded in the center of a rubber tab or embedment having a length of around 1 inch or so. The specimens are then aged at least 16 hours at room temperature. The force required to separate the cord from the rubber is then determined at room temperature or 250°F. using an INSTRON tester provided with specimen grips. The maximum force in pounds required to separate the cord from the rubber is the H-adhesion value.

Cords or fabric coated with the adhesive of the present invention using the one-step or single dip of this invention can have from about 10 to 40% by weight (dry) solids of the adhesive dip on the cord based on the weight of the cord and can be used in the manufacture of carcasses, belts, flippers and chafers of radial, bias, or belted-bias passenger tires, trunk tires, motorcycle and bicycle tires, off-the-road tires and airplane tires, and, also, in making transmission belts, v-belts, conveyor belts, hose, gaskets, rubbers, tarpaulins and the like.

The following examples will serve to illustrate the invention with more particularity to those skilled in the art. In these examples the parts are parts by weight unless otherwise indicated.

EXAMPLE I

The dip consisted of 100 grams vinyl pyridine rubber latex (1) to which 15 grams of 30% aqueous BRL-1031 (2) was added and subsequently a mixture of 5 grams of 50% aqueous Penacolite R-2170 (3) and 1 ml 2N aqueous NaOH. Fiberglass cords (4) were passed through the dip and then into an eight foot long tube in which hot air was blown in a direction opposite to the movement of the cord. The temperature where the air entered the tube was 60° to 90°F. higher than the temperature at the exit end of the tube. In Table I are recorded the highest temperatures during the drying or curing of the dipped cord. The speed of the cord through the oven can also be varied. After said drying and curing, the adhesive treated cords were laminated with the standard type rubber stock described supra, and molded, and the resulting assembly was cured for 20 minutes at 305°F. After curing, the assembly was removed from the mold, cooled and tested according to the H-adhesion test described supra. The following H-adhesions were obtained for the cords treated as described above.

Table I

| H-Adhesion* of Glass Fiber Cord for Different Processing Conditions | | | | |
|---|---|---|---|---|
| | Time in oven (seconds) | | | |
| Oven Temperature, °F. | 90 | 60 | 30 | 15 |
| 400 | 36.1 | 35.1 | 35.4 | 29.3 |
| 425 | 32.8 | 36.3 | 32.2 | 28.5 |
| 450 | 34.1 | 33.1 | 34.1 | 27.5 |
| 475 | 19.6 | 28.0 | 33.2 | 27.6 |

*"⅝" embedment. H-adhesion in lbs. at RT, room temperature (about 22–28°C.)

The results obtained show that better H-adhesions are obtained with curing accomplished at a temperature of from about 400° to 450°F. for from about 30 to 90 seconds.

Notes:
1. Aqueous alkaline (about pH 10.5–10.7) dispersion of a rubbery terpolymer of 70 parts by weight of butadiene-1,3, 15 parts of styrene and 15 parts of 2-vinyl pyridine, 41% by weight total solids (about 39% by weight rubber solids, balance surfactant, stabilizer) Mooney viscosity ML-4 min. at 212°F.= about 40, emulsion polymerized, freeze stable
2. Trimethylol phenol, Union Carbide Corp.
3. Preformed water-soluble resorcinol-formaldehyde novolak resin, Koppers Co., Inc.
4. G-15 cord, E glass, single strand tire cord of 2040 glass filaments, Owens-Corning Fiberglas Corporation.

EXAMPLE II

The method of this example was the same as that of Example I, above, except that all glass fiber cords were dried/cured for 60 seconds at 425°F. (maximum). Also, in A the dip is the same as the dip of Example I, above; in B the dip is the same as A except 25% by weight of the latex has been replaced with SBR-2000 (5); in C the dip is the same as A except that 50% by weight of the latex has been replaced with SBR-2000; and the D a commercially available dipped G-15 glass fiber tire cord (6) was tested. The results of the testers are shown in Table II, below:

Table II

| Run | Viscosity cp (7) | Pickup % (8) | Tensile Strength of Dipped Cord lbs. (9) | H-Adhesion lbs. RT | 250°F |
|---|---|---|---|---|---|
| A | 20.5 | 23.0 | 63.8 | 33 | 21 |
| B | 15.5 | 21.6 | 72.7 | 34 | 22 |
| C | 58.0 | 21.1 | 68.6 | 32 | 21 |
| D | — | 28.6 | 60.4 | 33 | 22 |

| Run | H-Adhesion, lbs., RT In Rubber Aging 24 hrs., 300°F dry (10) | over water (11) | Peel Test (12), lbs. RT | 250°F |
|---|---|---|---|---|
| A | 28 | 22 | 45 | 31 |
| B | 29 | 22 | 47 | 30 |
| C | 30 | 24 | 36 | 25 |
| D | 32 | 21 | 45 | 23 |

The results of these tests show that blends of latices can be used with achievement of comparable results. The cords of the present invention using blended latices also show increased tensile strengths.

Notes:
5. Emulsion polymerized copolymer of butadiene-1,3 and styrene, about 47% by weight of bound styrene, Mooney viscosity ML-4 min. at 212°F.= about 77, about 42% total solids, hot polymerized, pH about 11.2.
6. Dipped G-15 glass fiber cord. Corp dip composition on cord was unknown. Owens-Corning Fiberglas Crop.
7. Centipoises, viscosity determined after 21 days; initial viscosity was 12.5 cp.
8. By weight. Pickup determined by ignition loss.
9. Test used was ASTM D2970.
10. Sample was heated in a closed container at 300°F. for 24 hours under nitrogen before conducting H-adhesion test.
11. Sample was heated in a closed container with water present at 300°F. for 24 hours under nitrogen before conducting H-adhesion test.
12. Test used was modified ASTM D2630. Crosshead speed was 2 inches per minute.

EXAMPLE III

The method of this Example was the same as that of Examples I and II above, except that the ratio of the trimethylol phenol to the novolak was well as their total amounts were varied. The dipped cords were cured at 425°F. for 45 seconds, and the latex used was a mixture of 75 parts by weight of the above vinyl pyridine latex and 25 parts by weight of the SBR-2000 latex. The results obtained are summarized in Table III, below:

Table III

| Run No. | Total dry weight (2)+(3) per 100 Parts by weight of dry rubber (Phr)blend | Dry weight ratio (2)/(3) | Viscosity, cp after 3 months |
|---|---|---|---|
| 1 | 34 | 0.90 | coag.*after 3 mos. |
| 2 | 34 | 1.39 | coag.*after 1 mo. |
| 3 | 34 | 1.84 | coag. in 4 days |
| 4 | 17 | 0.90 | 17.0 |
| 5 | 17 | 1.39 | 12.6 |
| 6 | 17 | 1.84 | 14.5 |
| 7 | 8.5 | 0.90 | 14 |
| 8 | 8.5 | 1.39 | 14 |
| 9 | 8.5 | 1.84 | 14 |
| 10 | 5.0 | 0.90 | 14.5 |
| 11 | 5.0 | 1.39 | 15.5 |
| 12 | 5.0 | 1.84 | 16.0 |

| Run No. | Dried Dipped cord Tensile, lbs. | % Ignition Loss, by wt. | H-Adhesion, lbs. RT | 250°F |
|---|---|---|---|---|
| 1 | 65.6 | 19.4 | 35.7 | 20.8 |
| 2 | 60.5 | 20.6 | 37.6 | 22.4 |
| 3 | — | — | — | — |
| 4 | 65.1 | 19.1 | 32.2 | 21.6 |
| 5 | 63.3 | 18.4 | 34.5 | 24.5 |
| 6 | 71.6 | 16.2 | 34.0 | 22.6 |
| 7 | 67.8 | 14.7 | 33.4 | 21.4 |
| 8 | 65.0 | 12.7 | 31.4 | 20.3 |
| 9 | 68.3 | 11.4 | 28.6 | 21.1 |
| 10 | 63.6 | 14.3 | 31.3 | 21.1 |
| 11 | 66.4 | 14.5 | 31.9 | 20.4 |
| 12 | 67.3 | 14.5 | 32.1 | 20.3 |

*coag - Dip coagulated

The results of these tests show that considerable variation can be made in the components of the dip with obtainment of useful adhesions for the rubber stock to the glass fiber cord. The dips of Runs 7–9 are viscosity stable for about three months.

EXAMPLE IV

The method of this Example was the same as that of Example III, above, except that the foregoing Runs Nos. 4, 5 and 6 were tested more extensively. The results obtained are compiled in Table IV, below:

Table IV

| Run No. | Dry Weight Ratio (2)/(3) | Peel Test, lbs. RT | 250°F |
|---|---|---|---|
| 4-IV | 0.90 | 29.9 | 15.7 |
| 5-IV | 1.39 | 29.2 | 21.5 |
| 6-IV | 1.84 | 32.0 | 25.4 |

| Run No. | H-adhesion, After in Rubber Aging, lbs., RT $N_2$, 300°F 24hrs. | $N_2 + H_2O$, 300°F 24 hrs. |
|---|---|---|
| 4-IV | 29.2 | 20.6 |
| 5-IV | 26.2 | 22.6 |
| 6-IV | 26.8 | 20.7 |

EXAMPLE V

The method of this Example was the same as that of Example IV, above, except that the amount of aqueous NaOH was reduced so that it was used in an amount just enough to neutralize the Penacolite R-2170. The results obtained after testing are shown in Table V, below:

Table V

| Run No. | Dry Weight Ratio (2)/(3) | Peel Test, lbs. RT | 250°F |
|---|---|---|---|
| 4-V | 0.90 | 35.6 | 23.7 |
| 5-V | 1.39 | 49.2 | 30.2 |
| 6-V | 1.85 | 48.9 | 30.9 |

| Run | H-Adhesion, lbs. |

Table V-continued

| Run No. | Dry Weight Ratio (2)/(3) | | Peel Test, lbs. | |
|---|---|---|---|---|
| No. | RT | 250°F | RT | 250°F |
| 4-V | 33.7 | 22.4 | | |
| 5-V | 36.7 | 24.8 | | |
| 6-V | 33.4 | 23.6 | | |

The dips of these runs are viscosity stable for about a month.

EXAMPLE VI

The method of this Example, was the same as that of Example V, above, except that the total amount of the BRL-1031 and of the novolak was reduced. The results on testing are shown in Table VI, below:

Table VI

Change of Viscosity of Dips With Time
Resin content phr (dry), By weight

| | BRL-1031 | Penacolite R-2170 |
|---|---|---|
| A | 6.5 | 6.0 |
| B | 7.5 | 5.0 |
| C | 8.4 | 4.0 |
| D | 9.45 | 3.0 |

Viscosity, cp after:

| | 1 day | 10 days | 21 days | 30 days |
|---|---|---|---|---|
| A | 10.0 | 10.0 | 10.5 | 11.5 |
| B | 10.0 | 11.5 | 11.5 | 11.5 |
| C | 11.0 | 12.0 | 12.0 | 12.0 |
| D | 11.5 | 12.0 | 12.0 | 12.0 |

The average H-adhesion on glass of these four dips after 30 days was around 31 lbs. when pulled at room temperature and 16–18 lbs. when pulled at 250°F. These dips, also, are stable for at least 30 days.

EXAMPLE VII

The method of this Example was the same as that of Example VI, above, except that after 11 days different amounts of neutralized Penacolite R-2170 were added to the latex/BRL-1031 dispersion. These mixtures (TS = 42%) were used for the G-15 glass fiber cord. The processing conditions and laminating rubber stock are those already mentioned above.

Table VII

Delayed Addition of Penacolite R-2170
Adhesions on Glass

| Resin, phr (dry), by weight | | H-Adhesions, lbs. | |
|---|---|---|---|
| BRL-1031 | Penacolite R-2170 | RT | 250°F |
| 9.6 | 7.5 | 29.8 | 18.6 |
| 12.6 | 7.5 | 30.8 | 19.0 |
| 15.9 | 7.5 | 31.1 | 18.6 |
| 18.9 | 7.5 | 31.8 | 20.2 |
| 14.4 | 10.0 | 30.7 | 19.2 |
| 17.1 | 13.6 | 30.6 | 19.6 |

EXAMPLE VIII

The method of this Example was the same as that of Example VII, above, except that the dip (40% total solids) contained 15 parts (dry) per hundred of the rubber blend (dry) of the BRL-1031 and 1.25 phr of the Penacolite R-2170. The dips were aged before the glass cords were dipped in them. The results on testing are shown in Table VIII, below:

Table VIII

| Dip Aging Treatment | H-Adhesion, lbs., RT |
|---|---|
| 5 days at RT | 30 |
| 6 days at RT | 30 |
| 2 hrs. at 50°C. then 5 days at RT | 30 |

No measurable viscosity increase after heat treatment.

EXAMPLE IX

The method of this Example was the same as that for Example VIII, above, except that two levels of Penacolite or of resorcinol were used and the dips were heated for 4 hours at 50°C. (with no measurable viscosity increase) before the glass fiber cords were dipped in them. The results obtained on test are shown below in Table IX:

Table IX

| Resin Component | H-Adhesion, lbs., RT |
|---|---|
| Penacolite R-2170, 1.25 phr | 32 |
| Penacolite R-2170, 1.56 phr | 32 |
| Resorcinol, 1.25 phr | 32 |
| Resorcinol, 1.56 phr | 33 |

While in the foregoing examples, the adhesive containing glass fiber reinforcing elements can be adhered to a vulcanizable blend of natural rubber and rubbery butadiene-styrene copolymer by curing the same in combination together, it is apparent that said heat cured adhesive containing glass fiber reinforcing element can be adhered to other vulcanizable rubbery materials, by curing or vulcanizing the same in combination with the rubber, such as one of the foregoing rubbers as well as nitrile rubbers, chloroprene rubbers, polyisoprenes, polybutadienes, vinyl pyridine rubbers, acrylic rubbers, isoprene-acrylonitrile rubbers and the like and mixtures of the same. These rubbers can be mixed with the usual compounding ingredients including sulfur, stearic acid, zinc oxide, magnesium oxide, accelerators, antioxidants and other curatives, rubber compounding ingredients and the like well known to those skilled in the art for the particular rubbers being employed.

The embodiments of the invention in which an exclusive property or privilege is claimed are defined as follows:

1. A bonded composite material comprising a glass fiber reinforcing element embedded in a vulcanized rubber, said element containing from about 10 to 40% by weight (dry) based on the weight of said element of a heat cured adhesive composition comprising essentially 100 parts by weight of a rubbery vinyl pyridine copolymer, from about 2 to 28 parts by weight of trimethylol phenol and from about 1.25 to 24 parts by weight of at least one water soluble thermoplastic and non-heat hardenable resorcinol compound selected from the group consisting of resorcinol and a resorcinol-formaldehyde novolak and said composition forming a bond between said element and said rubber, said composition coating and at least substantially totally impregnating said element.

2. A bonded composite material comprising a glass fiber reinforcing element embedded in a vulcanized rubber, said element containing from about 10 to 40% by weight (dry) based on the weight of said element of a heat cured adhesive composition comprising essentially 100 parts by weight of a rubbery vinyl pyridine copolymer, from 2.4 to 22.1 parts by weight of trimethylol phenol and from 1.25 to 17.9 parts by weight of at least one water soluble thermoplastic and non-heat hardenable resorcinol compound selected from the group consisting of resorcinol and a resorcinol-formaldehyde novolak and said composition forming a bond between said element and said rubber, said composition coating and at least substantially totally impregnating said element.

3. A bonded composite material according to claim 2 in which said non-heat hardenable resorcinol compound is resorcinol.

4. A bonded composite material according to claim 2 in which said non-heat hardenable resorcinol compound is a resorcinol-formaldehyde novolak.

5. A bonded composite material according to claim 2 wherein said rubbery vinyl pyridine copolymer is a copolymer of from about 60 to 80% by weight of butadiene-1,3, from about 7 to 32% by weight of styrene, and from about 5 to 22% by weight of 2-vinyl pyridine and where said resorcinol compound is made by reacting resorcinol with formaldehyde in the mol ratio of about 1:0.5 to 2.

6. A bonded composite material according to claim 5 where said copolymer is a blend of a terpolymer of butadiene-1,3, sytrene and 2-vinyl pyridine and a copolymer of butadiene-1,3 and styrene.

7. A bonded composite material according to claim 5 where said element is a cord of about 2040 substantially parallel and continuous E glass filaments.

8. A bonded composite material according to claim 5 where said rubbery vinyl pyridine copolymer is a terpolymer of about 70% by weight of butadiene-1,3, 15% of styrene and 15% of 2-vinyl pyridine.

9. A bonded composite material according to claim 6 where said terpolymer is present in an amount of 75% by weight and said copolymer is present in an amount of 25% by weight.

10. A bonded composite material according to claim 6 where said terpolymer is present in an amount of 50% by weight and said copolymer is present in an amount of 50% by weight.

* * * * *